(12) United States Patent
Brillon et al.

(10) Patent No.: US 11,434,784 B2
(45) Date of Patent: Sep. 6, 2022

(54) BEARING PRELOAD USING EXTERNAL GEARBOX REACTION (71) Applicant: PRATT & WHITNEY CANADA CORP., Longueuil (CA)

(72) Inventors: Louis Brillon, Varennes (CA); Alain Carrieres, Boucherville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 372 days.

(21) Appl. No.: 16/568,812

(22) Filed: Sep. 12, 2019

(65) Prior Publication Data
US 2021/0078720 A1 Mar. 18, 2021

(51) Int. Cl.
F01D 25/18 (2006.01)
F01D 25/16 (2006.01)
B64C 27/12 (2006.01)
B64D 35/02 (2006.01)
F16C 19/06 (2006.01)
F16D 3/06 (2006.01)
F16C 25/08 (2006.01)
F02C 7/36 (2006.01)
F02C 7/06 (2006.01)
B64D 35/08 (2006.01)

(52) U.S. Cl.
CPC ........... F01D 25/186 (2013.01); B64D 35/02 (2013.01); F01D 25/164 (2013.01); F01D 25/168 (2013.01); F02C 7/06 (2013.01); F02C 7/36 (2013.01); F16C 19/06 (2013.01); F16C 25/083 (2013.01); F16D 3/06 (2013.01); B64C 27/12 (2013.01); B64D 35/08 (2013.01); F05D 2240/52 (2013.01); F05D 2240/54 (2013.01); F05D 2260/38 (2013.01); F05D 2260/52 (2013.01)

(58) Field of Classification Search
CPC ....... B64C 27/12; F01D 13/00; F01D 13/003; F01D 25/164; F01D 25/168; F01D 25/186; F02C 7/06; F02C 7/36
See application file for complete search history.

(56) References Cited

U.S. PATENT DOCUMENTS

| | | | | |
|---|---|---|---|---|
| 3,505,813 A | * | 4/1970 | Denis | F16C 19/522 417/408 |
| 5,967,762 A | | 10/1999 | Keller et al. | |
| 7,427,186 B2 | * | 9/2008 | Gerez | F01D 25/164 415/113 |
| 10,823,230 B2 | * | 11/2020 | Hochstetler | F16C 3/02 |
| 11,104,430 B2 | * | 8/2021 | Fenny | F16D 25/123 |
| 2012/0070110 A1 | | 3/2012 | Owens | |
| 2018/0080387 A1 | | 3/2018 | Boniface | |

* cited by examiner

Primary Examiner — Richard A Edgar
(74) Attorney, Agent, or Firm — Norton Rose Fulbright Canada

(57) ABSTRACT

A method of operating a gas turbine engine in a multi-engine aircraft, the gas turbine engine having an engine shaft mounted for rotation in a bearing and a gearbox connected to the engine shaft for torque transmission therebetween, includes axially preloading the bearing using an axially biasing element disposed between the gas turbine engine and the gearbox. The axially biasing element reacts against the gearbox to exert an axial preload force on the bearing and the engine shaft of the gas turbine engine.

15 Claims, 8 Drawing Sheets

FIG-5

BEARING PRELOAD USING EXTERNAL GEARBOX REACTION

TECHNICAL FIELD

The disclosure relates generally to multi-engine aircraft and methods of operating same, and more particularly to operation of an aircraft propulsion gas turbine engine in a multi-engine aircraft.

BACKGROUND

In a multi-engine aircraft, such as helicopters, two or more propulsion gas turbine engines may be provided to drive a main rotor via a common gearbox, and each of the engines is sized to provide power greater than what is required for cruising using both/all engines. It can however be desirable to operate one of the engines at a very low power output (e.g. "standby" condition) during cruise, in order to reduce fuel consumption of this engine.

However, because most gas turbine engines are designed to run optimally at power outputs greater than the very low power conditions of such a standby mode, a number of considerations must be taken into account in order to be able to effectively operation one of the engines in a low power mode.

SUMMARY

There is accordingly provided a method of operating a gas turbine engine in a multi-engine aircraft, the gas turbine engine having an engine shaft mounted for rotation in a bearing, and a gearbox connected to the engine shaft for torque transmission therebetween, the method comprising axially preloading the bearing using an axially biasing element disposed between the gas turbine engine and the gearbox, wherein the axially biasing element reacts against the gearbox to exert an axial preload force on the bearing and the engine shaft of the gas turbine engine.

There is further provided a multi-engine aircraft comprising: at least two prime mover gas turbine engines each capable of providing motive power in flight to the aircraft and respectively including an engine casing supporting an engine shaft mounted for rotation in a bearing; a gearbox including a gearbox housing mounted to the engine casing with a gimbal joint, the gearbox housing supporting a rotary connector shaft; and an axially flexible coupling including an axially biasing element disposed between the gas turbine engine and the gearbox, the axially biasing element configured to bias against the gearbox housing to exert an axial preload force on the engine shaft and the bearing.

Further details of these and other aspects of the subject matter of this application will be apparent from the detailed description included below and the drawings.

DETAILED DESCRIPTION

Figure 1:
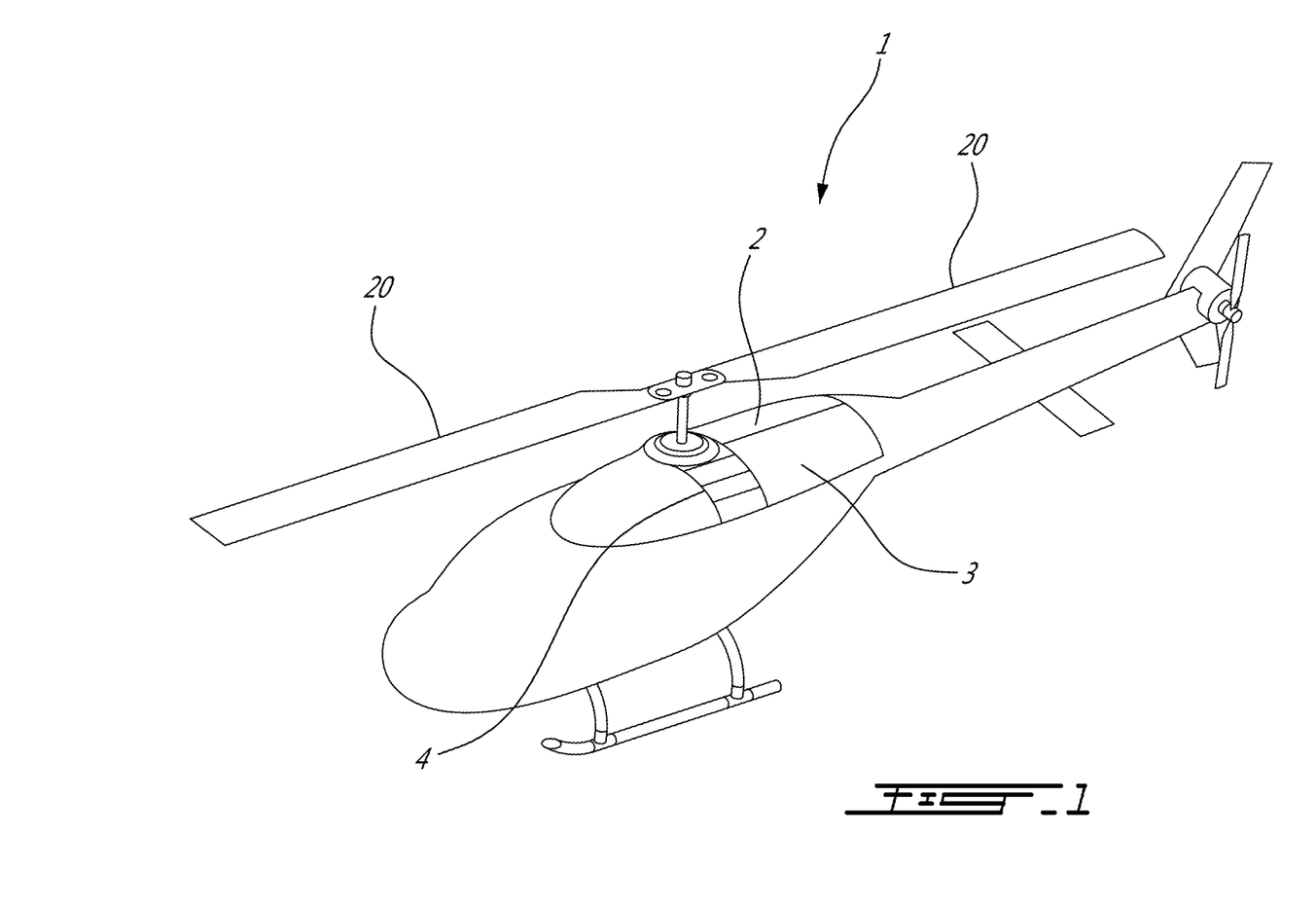
FIG. 1 is a schematic view of an example multi-engine aircraft comprising a dual engine helicopter.

FIG. 1 depicts an exemplary multi-engine aircraft 1, such as a helicopter. The aircraft 1 may however also be a multi-engine fixed-wing aircraft. The aircraft 1 includes at least two gas turbine engines 2 and 3 that may be interconnected by a common gearbox 4 to form a multi-engine drive system 5 as shown in FIG. 2.

Figure 2:
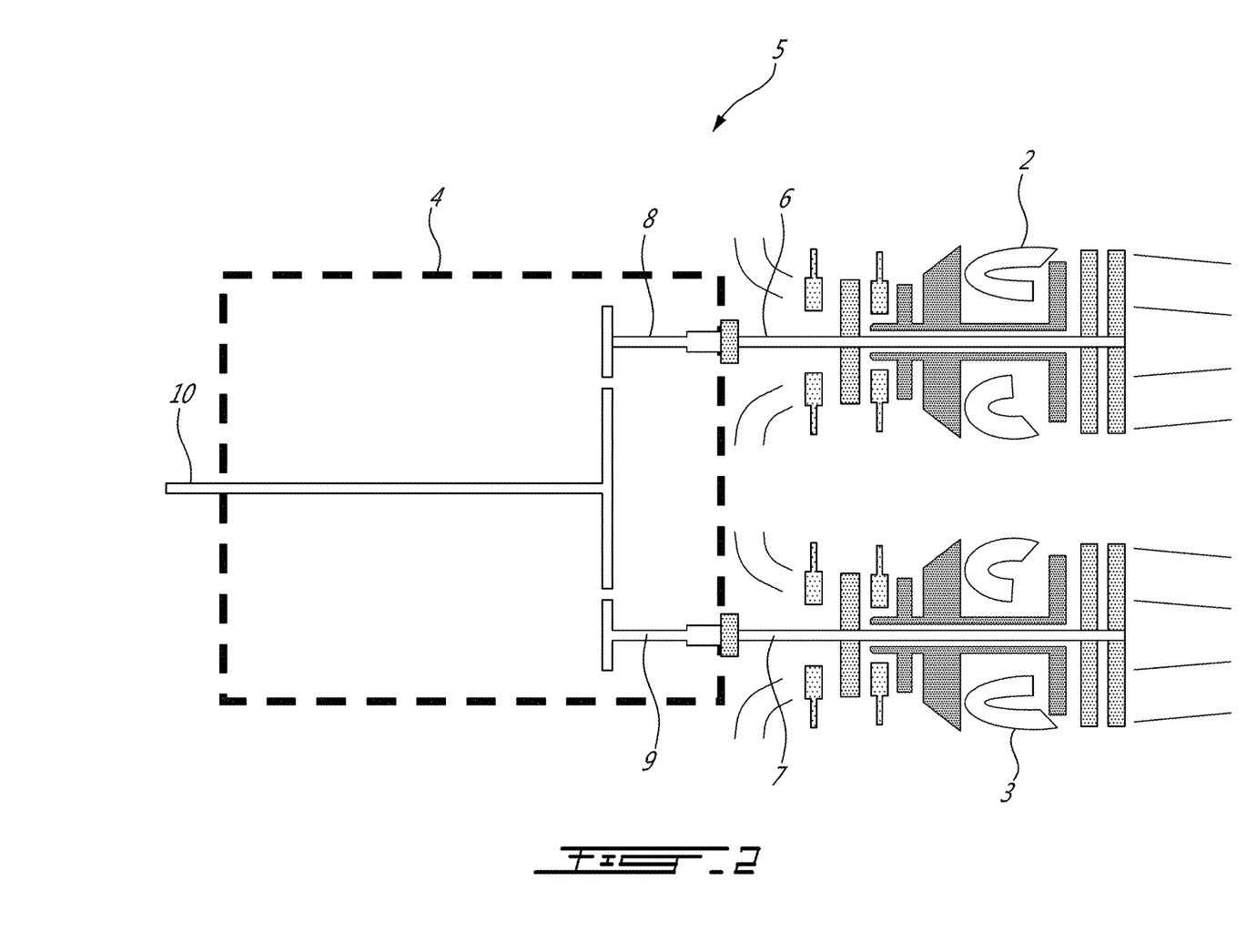
FIG. 2 is a schematic axial sectional view through the dual engines of the aircraft in FIG. 1 with the engine connector shafts joined to the helicopter gearbox.

FIG. 2 illustrates a schematic representation of an exemplary multi-engine system 5 that may be used as a power plant for the aircraft 1. The multi-engine system 5 comprises two or more gas turbine engines 2, 3. In addition to airborne applications, the multi-engine system 5 may be used in marine or industrial applications. The multi-engine system 5 of FIG. 2 includes main and reserve turboshaft gas turbine engines 2, 3 each having an engine shaft 6, 7 that are interconnected by a connector shaft 8, 9 of the common gearbox 4 to drive a common load shaft 10. In one embodiment, the common load shaft 10 may drive a rotary wing 20 of a rotary-wing aircraft.

Each of turboshaft engines 2, 3 may be drivingly coupled to the common load shaft 10 via the gearbox 4, which may be of a speed-reduction type. The gear box 4 may be configured to permit the common load shaft 10 to be driven by either of the turboshaft engines 2, 3 alone, or by a combination of both engines 2, 3 operating together. During idle cruise regime operation, one engine 2 is operated to deliver motive power while the other engine 3 is in idle mode. For example an idle cruise regime may be used in multi-engine aircraft 1 to reduce fuel consumption during cruise operation while both engines 2, 3 may be operated with full power during takeoff, landing or during an emergency. In marine or industrial applications, low power demands may occur when one engine 2 is sufficient for the demand and the other engine 3 may be operated in idle mode to reduce fuel consumption and serve as a standby.

Figure 3:
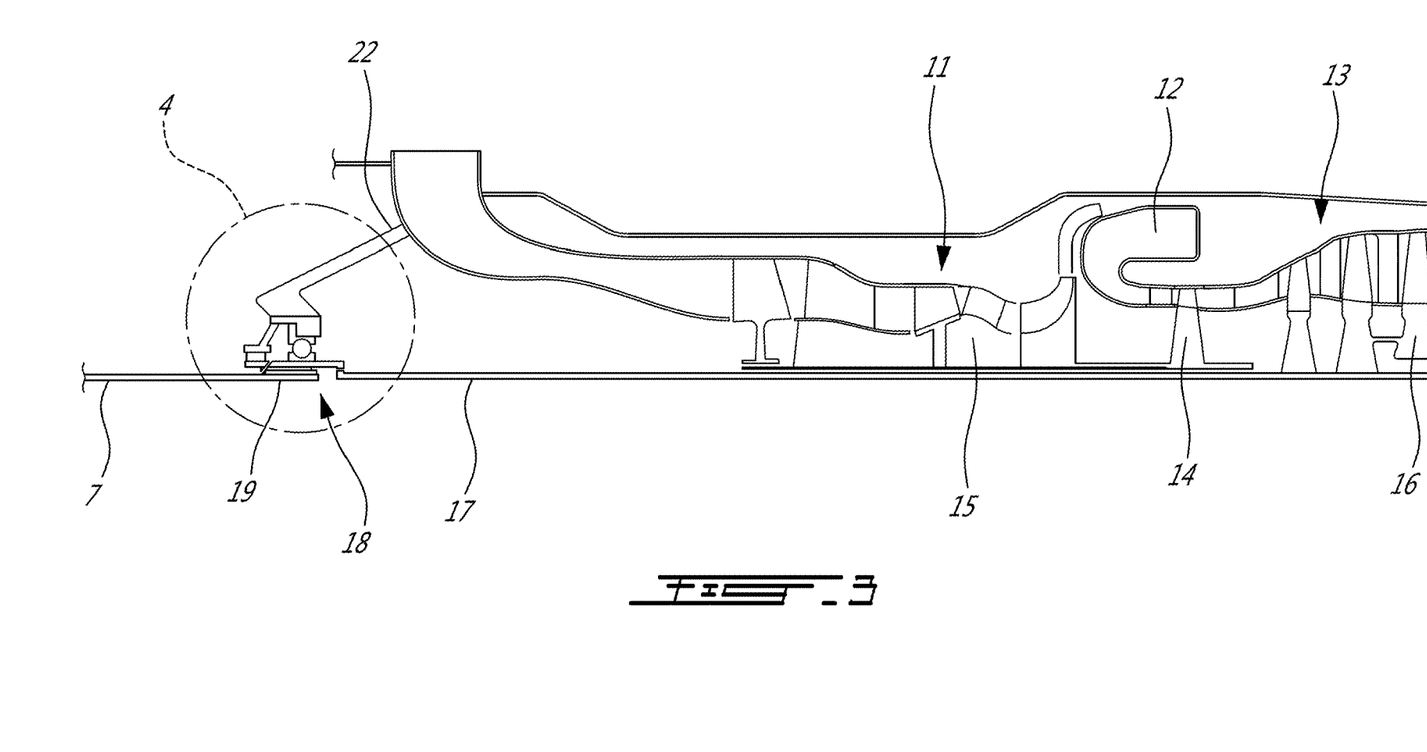
FIG. 3 is a partial axial cross-sectional view through an engine showing a forward bearing supporting an engine shaft.

Referring to FIG. 3, the gas turbine engines 2, 3 generally include, in serial flow communication, a compressor section 11 for pressurizing the air, a combustor 12 in where the compressed air is mixed with fuel and ignited for generating an annular stream of hot combustion gases, and a turbine section 13 for extracting energy from the combustion gases. In the embodiment of FIG. 3, a high pressure turbine 14 drives a high pressure engine shaft 15 to which both the compressor section 11 are connected for driving the high pressure engine shaft 15. A low pressure turbine 16 drives a low pressure turbine shaft 17 which is coaxial with the high pressure engine shaft 15.

Figure 4:
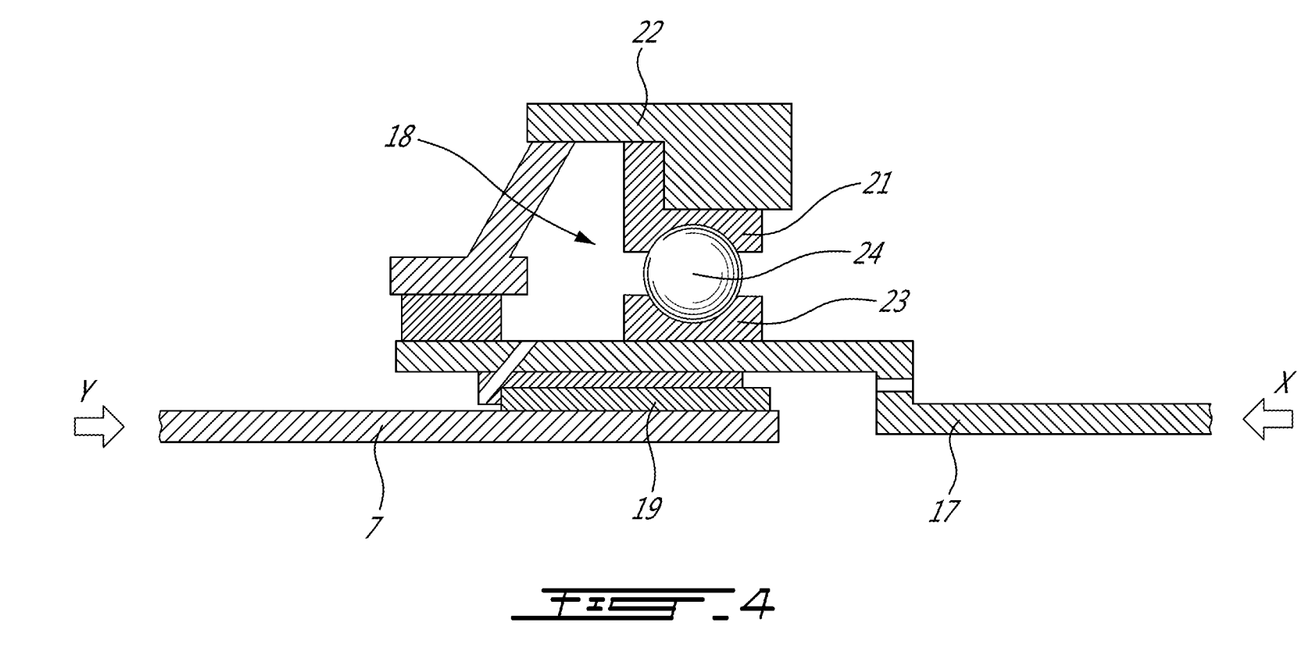
FIG. 4 is a detail axial sectional view, taken from region 4 in FIG. 3, showing the forward bearing of engine.

Referring to FIGS. 3 and 4, the low pressure turbine shaft 17 is supported by the forward bearing 18. A sliding spline joint 19 connects the engine output shaft 7 and the low pressure turbine shaft 17. As indicated in FIG. 2, the engine output shafts 6, 7 drive the connector shafts 8, 9, the gearbox 5, and the common load shaft 10.

The present description relates generally to operating a multi-engine system 1, where one engine 2 is capable of providing motive power, and a second engine 3 may be maintained in a very low-power, or idle mode to reduce fuel consumption while remaining on standby or reserve if needed for additional motive power.

With reference to the gas turbine engines 2, 3 as illustrated in FIG. 2, control of the multi-engine system 5 comprising these two engines 2, 3 is effected by one or more controller (s), which may be FADEC(s), electronic engine controller(s) (EEC(s)), or the like, that are programmed to manage, the operation of the engines to reduce an overall fuel burn, particularly during sustained cruise operating regimes, wherein the helicopter is operated at a sustained (steady-state) cruising speed and altitude. The cruise operating regime is typically associated with the operation of prior art engines at equivalent part-power, such that each engine contributes approximately equally to the output power of the multi-engine system. Other phases of a typical helicopter mission would include transient phases like take-off, climb, stationary flight (hovering), approach and landing. Cruise may occur at higher altitudes and higher speeds, or at lower altitudes and speeds, such as during a search phase of a search-and-rescue mission.

While the helicopter conditions (cruise speed and altitude) are substantially stable, the engines 2, 3 of the multi-engine system 5 may be operated asymmetrically, with one engine operated in a high-power "active" mode and the other engine operated in a low-power "standby" mode. Doing so may provide fuel saving opportunities to the helicopter, however there may be other suitable reasons why the engines are desired to be operated asymmetrically. This operation management may therefore be referred to as an "asymmetric mode" or an "asymmetric operating regime", wherein one of the two engines is operated in a low-power "standby mode" while the other engine is operated in a high-power "active" mode. In such an asymmetric mode, which may be engaged during a helicopter cruise phase of flight (continuous, steady-state flight which is typically at a given commanded constant helicopter cruising speed and altitude). The multi-engine system may be used in an aircraft, such as a helicopter, but also has applications in suitable marine and/or industrial applications or other ground operations.

According to the present description, the multi-engine system 5 driving the helicopter 1 may be operated in this asymmetric mode, in which a first of the turboshaft engines (say, the first engine 2) may be operated at high power in an active mode and a second engine (say, the second engine 3) may be operated in a low-power standby mode. In one example, the first turboshaft engine 2 may be controlled by the controller(s) to run at full (or near-full) power conditions in the active mode, to supply substantially all or all of a required power and/or speed demand of the common load. The second turboshaft engine 3 may be controlled by the controller(s) to run at low-power or no-output-power conditions to supply substantially none or none of a required power and/or speed demand of the common load. Optionally, a clutch may be provided to declutch the low-power engine. Controller(s) may control the engine's governing on power according to an appropriate schedule or control regime. The controller(s) may comprise a first controller for controlling the first engine and a second controller for controlling the second engine. The first controller and the second controller may be in communication with each other in order to implement the operations described herein. In some embodiments, a single controller may be used for controlling the first engine and the second engine.

In another example, an asymmetric operating regime of the engines may be achieved through the one or more controller's differential control of fuel flow to the engines, as described in pending application Ser. No. 16/535,256, the entire contents of which are incorporated herein by reference. Low fuel flow may also include zero fuel flow in some examples. In another example, the engine system may be operated in an asymmetric operating regime by control of the relative speed of the engines using controller(s), that is, the standby engine is controlled to a target low speed or "sub-idle" speed and the active engine is controlled to a target high speed. Still other control regimes may be available for operating the engines in the asymmetric operating regime, such as control based on a target pressure ratio, or other suitable control parameters. Although the examples described herein illustrate two engines, asymmetric mode is applicable to more than two engines, whereby at least one of the multiple engines is operated in a low-power standby mode while the remaining engines are operated in the active mode to supply all or substantially all of a required power and/or speed demand of a common load.

When one of the two engines, such as the second engine 3, is run in the standby mode as described above, a significantly lower axial load is generated on the forward bearing of the standby engine relative to the "active" engine providing full power. This lower axial load may be limited to the aerodynamic load imposed by the low pressure turbines and/or compressors operating under such standby conditions. Consequently, the forward bearing can be left practically free of axial loading from the engine and subjected to alternating axial loads generated by helicopter main rotor load in load fluctuations from the helicopter gear box and helicopter rotor blades. This is undesirable for bearing structural integrity, as many bearings, and particularly ball bearings, require a certain amount of axial loading to be maintained in order to ensure maximise service life.

Referring now to FIG. 4, the present description will now refer in particular to the forward bearing 18 and the means by which a minimal axial load or preload is applied to avoid load reversals and reduce wear. As noted above, the idle cruise regime condition generates a significantly low axial load on the forward bearing 18, generally limited to the aerodynamic load delivered by the low pressure turbines 16 operating under idle conditions. In the example of FIG. 4, the forward bearing 18 is substantially free of axial loading (arrow X) from the low pressure engine shaft 17 and is subjected to possibly alternating directional axial load (arrow Y) transmitted by the engine output shaft 7 originating from the helicopter main rotor load fluctuations transmitted by the helicopter gear box 4 and helicopter rotor blades (20—see FIG. 1). The helicopter main rotor load fluctuations are due to vibrations and relative motion between the helicopter gearbox 4 and the connector shafts 8, 9. The relative motion tends to alternatively load the forward bearing 18. The outer race 21 of the forward bearing 18 is attached to the stationary engine casing 22 while the inner race 23 is mounted to the engine rotor (including the low pressure engine shaft 17 and engine output shaft 7). The alternating bearing loading condition is not desirable for structural integrity of the forward bearing 18 and a reduced bearing service life may result. Preferably the axial load on the ball 24, outer race 21 and inner race 23 does not alternate in axial direction but remains preloaded or uni-directional at an axial load value above a minimum axial load value. Although the Figures illustrate a ball 24 as a bearing member, it will be understood that other suitable rolling members capable of transmitting axial loads may also be used, such as conical rollers.

Figure 5:
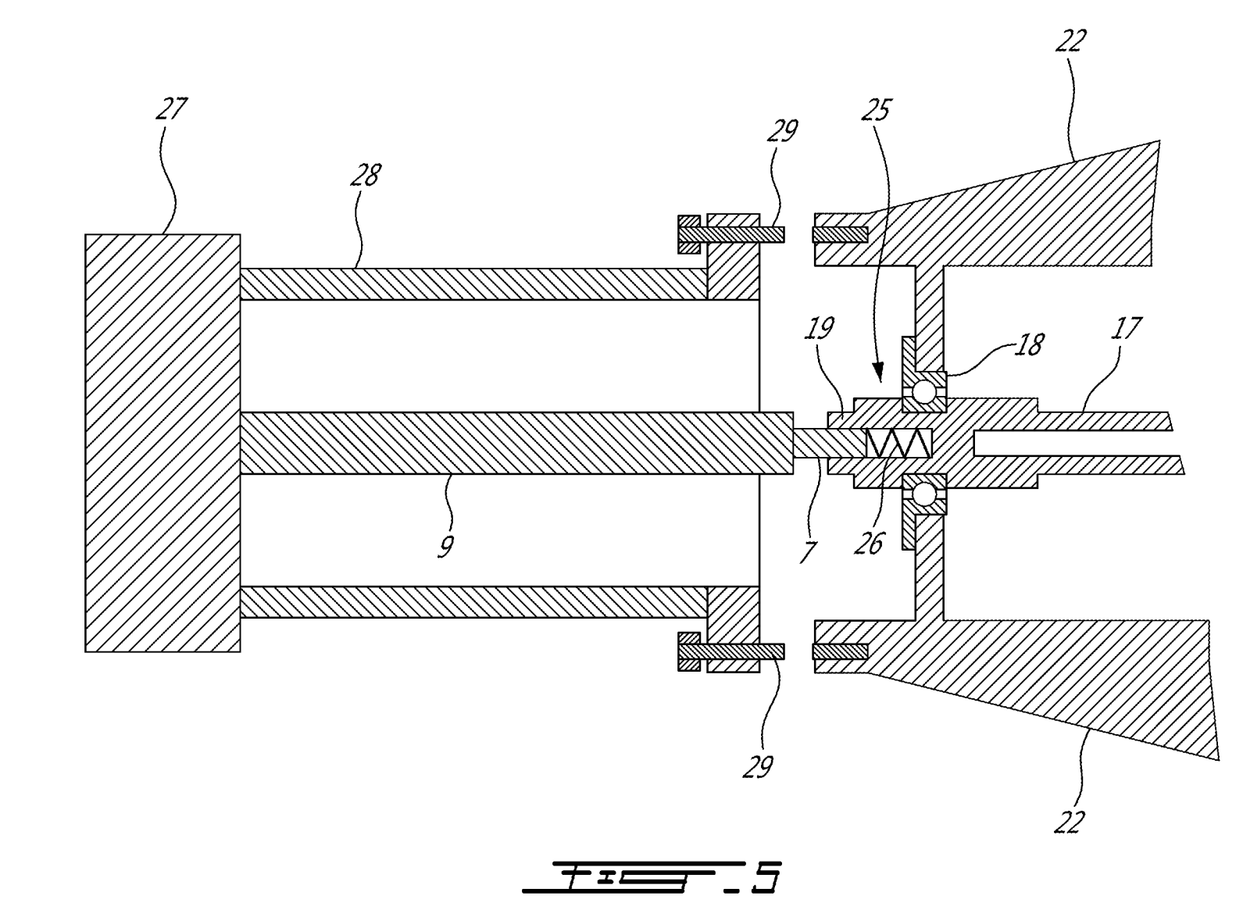
FIG. 5 is a schematic axial sectional view showing the engine output shaft and low pressure engine shaft joined with an axially flexible coupling comprising a resilient spring and an axially sliding splined joint.
Figure 6:
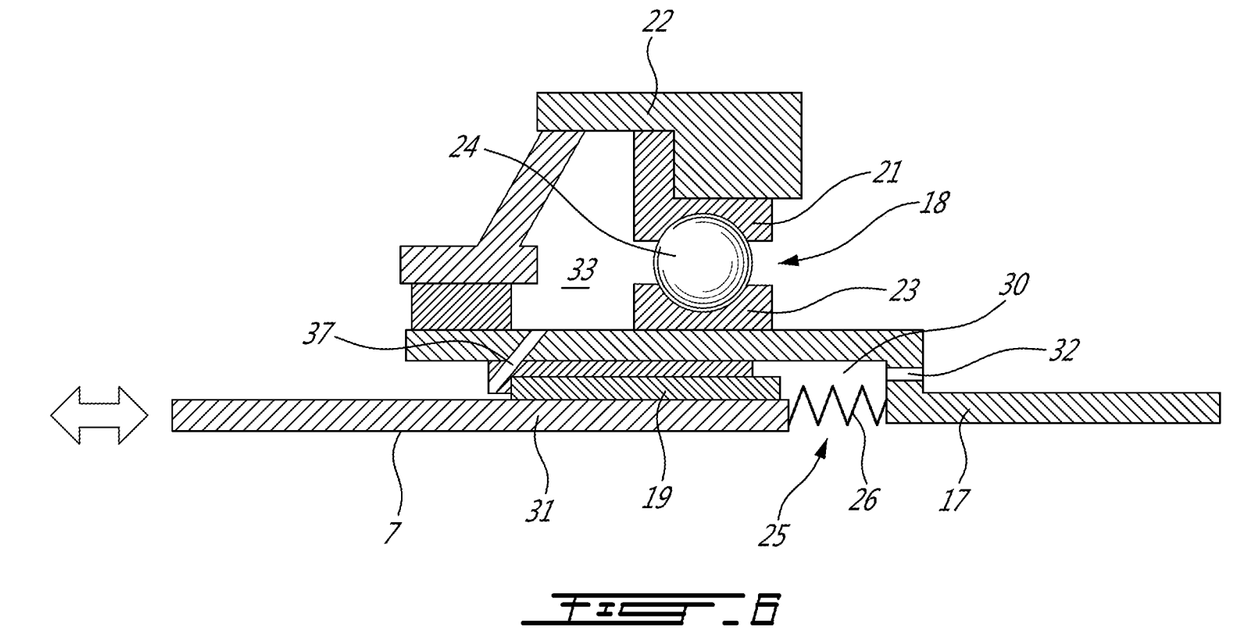
FIG. 6 is a detail axial sectional view like FIG. 4 with the addition of an annular spring located aft of the splined joint.

FIG. 5 shows a schematic axial sectional view showing the engine output shaft 7 and low pressure engine shaft 17 joined with an axially flexible coupling 25. In the example of FIGS. 5 and 6, the axially flexible coupling 25 comprises a spring 26 and a sliding spline joint 19. As indicated with arrows in FIG. 6, the spring 26 and axially sliding spline joint 19 allows the engine output shaft 7 to move axially under alternating axial loads (arrows) from the gearbox 4 without transferring significant axial load to the ball 24, outer race 21 and inner race 23. The sliding spline joint 19 transfers torque loads but slides axially to compress and relax the spring 26 under alternating axial loading. The spring 26 maintain a minimum preload on the forward bearing 18.

Referring to FIGS. 1 and 2, the multi-engine aircraft 1 has at least two prime mover gas turbine engines 2, 3 comprising a main engine 2 and a reserve engine 3 each capable of providing motive power in flight to the aircraft 1. Of course the main or reserve designation can be selected by a pilot or machine operator. Referring to FIGS. 5 and 6, the reserve engine 3 has an engine casing 22 supporting a low pressure engine shaft 17 mounted for rotation in a forward bearing 18. The gearbox 4 includes a gearbox housing 27 mounted to the engine casing 22 with a gimbal joint 28. The gearbox housing 27 supports the rotary connector shaft 9 which is connected to the engine output shaft 7. In the example of FIGS. 5 and 6, the axially flexible coupling 25 is disposed in the engine output shaft 7 and comprises a spring 26 and axially sliding spline joint 19. The axially flexible coupling 25 includes an axially biasing element such as the spring 26 for exerting an axial preload force on the low pressure engine shaft 17 and the forward bearing 18.

Referring to FIG. 5, the gimbal joint 28 is mounted to the engine casing 22 with axial fasteners or bolts 29 to compress the axially compressible spring 26 when the gimbal joint 28 is mounted. The axial force is reacted against the gearbox housing 27 and is exerted on the axially compressible spring 26. In the illustrations the axial fasteners 29 comprise threaded bolts but any axial connector could be used to provide a controlled and locked preloading of the spring 26.

Referring to FIG. 6, the axially compressible coupling 25 comprises a sleeve portion 30 of the low pressure shaft 17 surrounding a shank portion 31 of the engine output shaft 7 and joined with matching axial splines in a sliding spline joint 19. The sleeve portion 30 and shank portion 31 engage the resilient member or spring 26. The resilient member 26 can be: a helical spring; a conical disc spring (Belleville spring); an annular wave spring; a ring spring; or an elastomeric block. FIG. 6 shows a lubricant inlet passage 32 to provide lubricant to the sliding spline joint 19, as part of a spline lubrication system, to ensure that the sliding spline joint 19 remains axially slidable. Another fluid passage 37 may also be provided, extending through a portion of the engine shaft 17 and in communication with the bearing gallery 33, to permit cooling and/or blurbification fluid to enter or exit the bearing gallery cavity 33.

Figure 7:
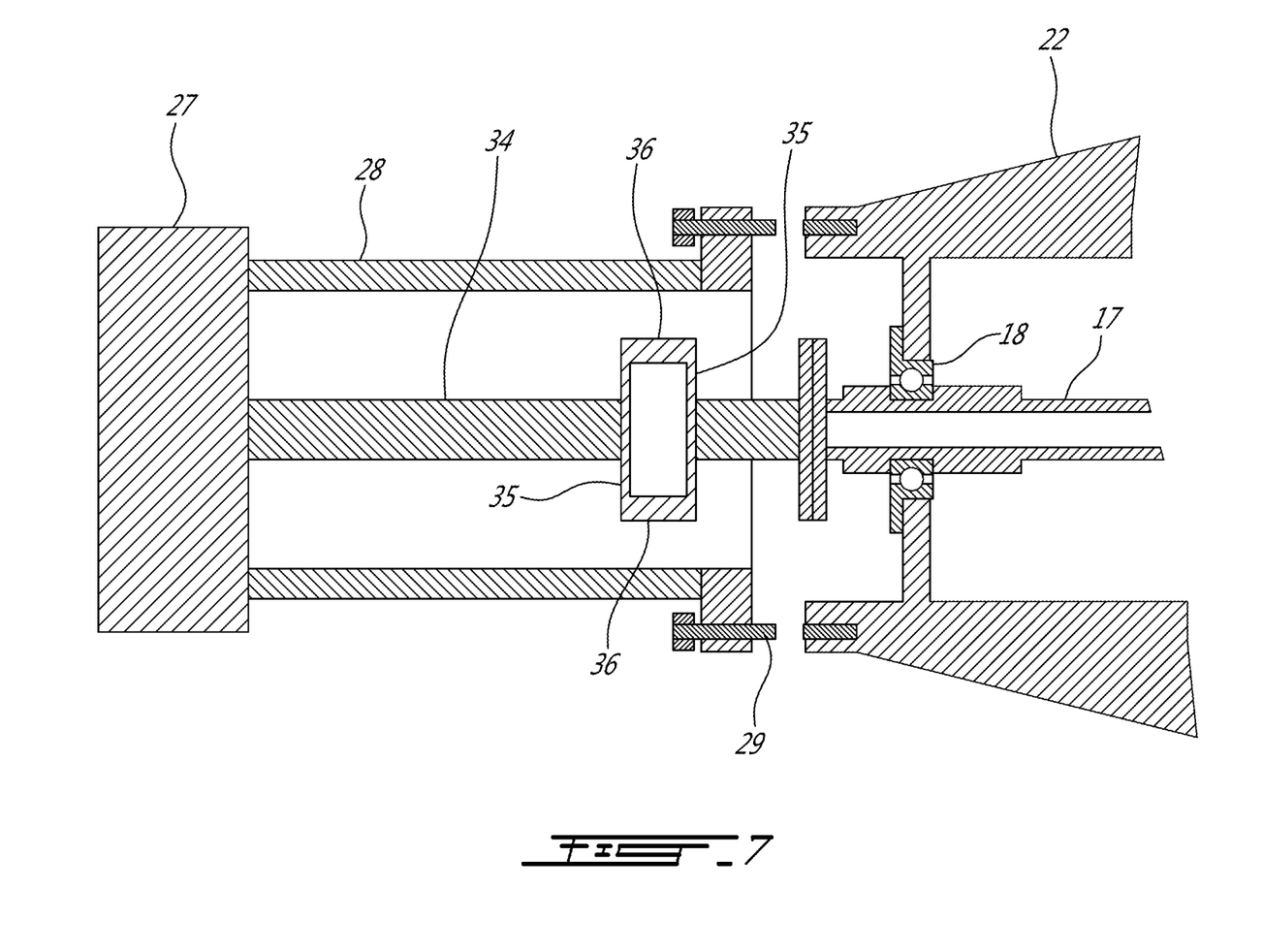
FIG. 7 is a schematic axial sectional view showing the engine shaft and connector shaft joined with an axially flexible coupling comprising a pair of disc flanges and an annular sleeve.
Figure 8:
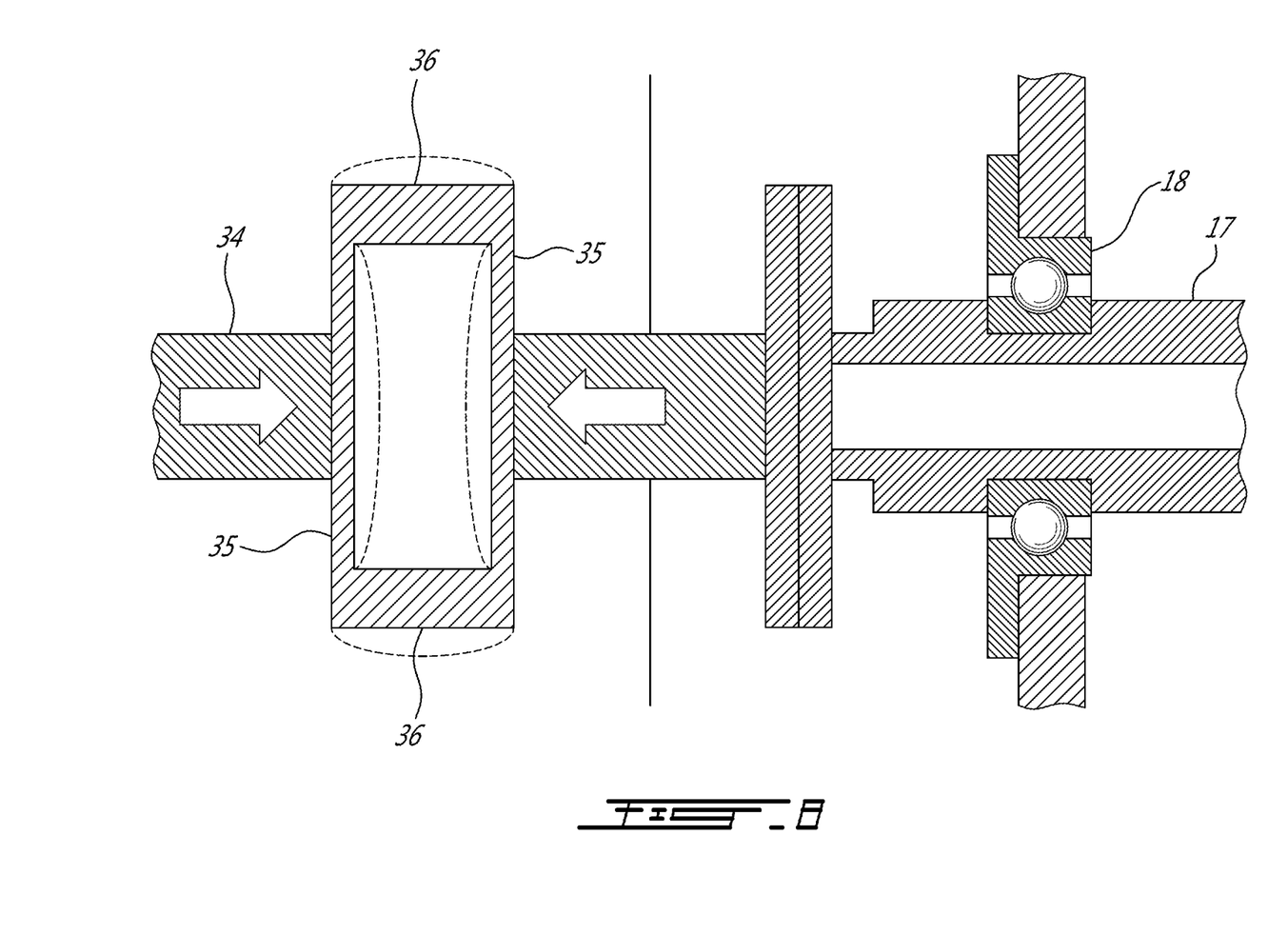
FIG. 8 is a detail view of the pair of disc flanges and annular sleeve subjected to a compressive axial load which deforms the flanges and sleeve as indicated in dashed outline.

FIGS. 7 and 8 show an alternative to provide an axially biasing element in the connector shaft 34 comprising a pair of radial flanges 35 joined with an annular sleeve 36. FIG. 8 shows in dashed outline the deformation or flexing of the flanges 35 and sleeve 36 when an axial load is applied to the connector shaft 34. The axial force to deform the flanges 35 and sleeve 36 is reacted against the gearbox housing 27. To control flexibility and distortion, the pair of radial flanges 35 can be solid, perforated or comprise a plurality of radial spokes. Likewise the annular sleeve 36 be solid, perforated or comprise a plurality of axial spokes. The degree of flexibility that is required can be determined by the engine designer.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the embodiments set forth in the examples, but should be given the broadest interpretation consistent with the description as a whole.

What is claimed is:

1. A method of operating a gas turbine engine in a multi-engine aircraft, the gas turbine engine having an engine shaft mounted for rotation in a bearing, and a gearbox connected to the engine shaft for torque transmission therebetween, the gearbox mounted to the gas turbine engine with a gimbal joint, the method comprising applying an axial preload force on the bearing using an axially biasing element of an axially flexible coupling, the axially flexible coupling disposed between and interconnecting the gas turbine engine and the gearbox, wherein the axially biasing element reacts against the gearbox to exert axial preload force on the bearing and the engine shaft of the gas turbine engine, and compressing the axially biasing element using the gimbal joint.

2. The method according to claim 1, comprising:
the axially flexible couple in one of: the engine shaft; and
a rotary connector shaft of the gearbox.

3. A method of operating a gas turbine engine in a multi-engine aircraft, the gas turbine engine having an engine shaft mounted for rotation in a bearing, and a gearbox connected to the engine shaft for torque transmission therebetween, the method comprising:
applying an axial preload force on the bearing using an axially biasing element of an axially flexible coupling, the axially flexible coupling disposed between and interconnecting the gas turbine engine and the gearbox, wherein the axially biasing element reacts against the gearbox to the exert the axial preload force on the bearing and the engine shaft of the gas turbine engine,
the axially flexible coupling comprises a sleeve surrounding a shank, the sleeve and shank engaging a resilient member and including matching axial splines, and lubricating the matching axial splines using a spline lubrication system.

4. A multi-engine aircraft comprising:
at least two prime mover gas turbine engines each capable of providing motive power in flight to the aircraft and respectively including an engine casing supporting an engine shaft mounted for rotation in a bearing;
a gearbox including a gearbox housing mounted to the engine casing with a gimbal joint, the gearbox housing supporting a rotary connector shaft; and
an axially flexible coupling including an axially biasing element disposed between the gas turbine engine and the gearbox, the axially biasing element configured to bias against the gearbox housing to exert an axial preload force on the engine shaft and the bearing.

5. The multi-engine aircraft according to claim 4 wherein the gimbal joint is mounted to the engine casing with the axial fasteners to compress the axially biasing element.

6. The multi-engine aircraft according to claim 5 wherein the axial fasteners comprise threaded bolts.

7. The multi-engine aircraft according to claim 4 wherein the axially flexible coupling comprises a sleeve surrounding a shank, and the axially biasing element comprises a resilient member, the sleeve and shank engaging the resilient member.

8. The multi-engine aircraft according to claim 7 wherein the sleeve and shank include matching axial splines.

9. The multi-engine aircraft according to claim 8 including a spline lubrication system.

10. The multi-engine aircraft according to claim 7 wherein the resilient member is selected from the group consisting of: a helical spring; a conical disc spring; an annular wave spring; a ring spring; and an elastomeric block.

11. The multi-engine aircraft according to claim 4 wherein the axially biasing element comprises a pair of radial flanges joined with an annular sleeve.

12. The multi-engine aircraft according to claim 11 wherein the pair of radial flanges comprise a plurality of radial spokes.

13. The multi-engine aircraft according to claim 12 wherein the pair of radial flanges comprise a plurality of axial spokes.

14. The multi-engine aircraft according to claim 4 wherein the bearing comprises a ball bearing.

15. The multi-engine aircraft according to claim 4 wherein the axially flexible coupling is disposed in the engine shaft or the rotary connector shaft.

* * * * *